United States Patent [19]
Manning et al.

[11] Patent Number: 5,917,805
[45] Date of Patent: Jun. 29, 1999

[54] NETWORK SWITCH UTILIZING CENTRALIZED AND PARTITIONED MEMORY FOR CONNECTION TOPOLOGY INFORMATION STORAGE

[75] Inventors: Thomas A. Manning, Northboro; Stephen A. Caldara, Sudbury; Stephen A. Hauser, Burlington; Alan D. Sherman, Acton, all of Mass.

[73] Assignees: Fujitsu Network Communications, Inc., Richardson, Tex.; Fujitsu Limited, Kawasaki, Japan

[21] Appl. No.: 08/685,240

[22] Filed: Jul. 18, 1996

Related U.S. Application Data

[60] Provisional application No. 60/001,498, Jul. 19, 1995.

[51] Int. Cl.$^6$ ................................................. H04L 12/56
[52] U.S. Cl. ............................. 370/236; 370/390; 370/414
[58] Field of Search ........................ 370/390, 395, 370/412, 413, 414, 415, 386, 388, 398, 230, 235, 236, 392

[56] References Cited

U.S. PATENT DOCUMENTS

| | | | |
|---|---|---|---|
| 3,804,991 | 4/1974 | Hammond et al. | 179/26 |
| 3,974,343 | 8/1976 | Cheney et al. | 179/18 ES |
| 4,069,399 | 1/1978 | Barrett et al. | 179/15 AL |
| 4,603,382 | 7/1986 | Cole et al. | 364/200 |
| 4,715,030 | 12/1987 | Koch et al. | 370/85 |
| 4,727,537 | 2/1988 | Nichols | 370/85 |
| 4,737,953 | 4/1988 | Koch et al. | 370/94 |
| 4,797,881 | 1/1989 | Ben-Artzi | 370/88 |
| 4,821,034 | 4/1989 | Anderson et al. | 340/825.8 |
| 4,837,761 | 6/1989 | Isono et al. | 370/60 |
| 4,849,968 | 7/1989 | Turner | 370/94 |
| 4,870,641 | 9/1989 | Pattavina | 370/60 |
| 4,872,159 | 10/1989 | Hemmady et al. | 370/60 |
| 4,872,160 | 10/1989 | Hemmady et al. | 370/60 |
| 4,878,216 | 10/1989 | Yunoki | 370/60 |
| 4,893,302 | 1/1990 | Hemmady et al. | 370/60 |
| 4,893,307 | 1/1990 | McKay et al. | 370/94.1 |

(List continued on next page.)

FOREIGN PATENT DOCUMENTS 484943  3/1992  Japan .

OTHER PUBLICATIONS

An Ascom Timeplax White Paper, *Meeting Critical Requirements with Scalable Enterprise Networking Solutions Based on a Unified ATM Foundation*, pp. 1–12, Apr. 1994–Apr. 1995?.

*Primary Examiner*—Chau Nguyen
*Attorney, Agent, or Firm*—Weingarten, Schurgin, Gagnebin & Hayes LLP

[57] ABSTRACT

A network switch utilizing centralized and partitioned memory for storing connection topology information. The switch includes at least one input port, at least one output port and a central switch fabric interconnecting the input port and output port, with the connection topology memory centralized at the switch fabric. The central switch fabric includes at least one input side translator associated with a predetermined number of input ports and at least one output side translator associated with a predetermined number of output ports. The connection topology memory is distributed among the at least one input side translator and the at least one output side translator. With this arrangement, memory bandwidth requirements associated with connection topology look-up operations are distributed and scaling the number of ports is facilitated.

12 Claims, 3 Drawing Sheets

U.S. PATENT DOCUMENTS

| | | | |
|---|---|---|---|
| 4,894,824 | 1/1990 | Hemmady et al. | 370/58.3 |
| 4,897,841 | 1/1990 | Gang, Jr. | 370/85.13 |
| 4,899,333 | 2/1990 | Roediger | 370/60 |
| 4,920,531 | 4/1990 | Isono et al. | 370/60 |
| 4,922,503 | 5/1990 | Leone | 370/85.13 |
| 4,933,938 | 6/1990 | Sheehy | 370/85.13 |
| 4,947,390 | 8/1990 | Sheehy | 370/85.13 |
| 4,953,157 | 8/1990 | Franklin et al. | 370/60 |
| 4,956,839 | 9/1990 | Torii et al. | 370/60 |
| 4,958,341 | 9/1990 | Hemmady et al. | 370/60.1 |
| 4,979,100 | 12/1990 | Makris et al. | 364/200 |
| 4,993,018 | 2/1991 | Hajikano et al. | 370/60 |
| 5,021,949 | 6/1991 | Morten et al. | 364/200 |
| 5,029,164 | 7/1991 | Goldstein et al. | 370/95.1 |
| 5,060,228 | 10/1991 | Tsutsui et al. | 370/85.13 |
| 5,067,123 | 11/1991 | Hyodo et al. | 370/58.1 |
| 5,070,498 | 12/1991 | Kakuma et al. | 370/60 |
| 5,083,269 | 1/1992 | Syobatake et al. | 395/425 |
| 5,084,867 | 1/1992 | Tachibana et al. | 370/60 |
| 5,084,871 | 1/1992 | Carn et al. | 370/94.1 |
| 5,090,011 | 2/1992 | Fukuta et al. | 370/60 |
| 5,090,024 | 2/1992 | Vander Mey et al. | 375/1 |
| 5,093,912 | 3/1992 | Dong et al. | 395/650 |
| 5,115,429 | 5/1992 | Kluchyj et al. | 370/84 |
| 5,119,369 | 6/1992 | Tanabe et al. | 370/60 |
| 5,119,372 | 6/1992 | Verbeek | 370/85.3 |
| 5,128,932 | 7/1992 | Li | 370/60 |
| 5,130,975 | 7/1992 | Akata | 370/60 |
| 5,130,982 | 7/1992 | Ash et al. | 370/85.7 |
| 5,132,966 | 7/1992 | Hayano et al. | 370/79 |
| 5,146,474 | 9/1992 | Nagler et al. | 375/10 |
| 5,146,560 | 9/1992 | Goldberg et al. | 385/200 |
| 5,150,358 | 9/1992 | Punj et al. | 370/84 |
| 5,151,897 | 9/1992 | Suzuki | 370/85.13 |
| 5,157,657 | 10/1992 | Potter et al. | 370/85 |
| 5,163,045 | 11/1992 | Caram et al. | 370/60.1 |
| 5,163,046 | 11/1992 | Hahne et al. | 370/79 |
| 5,179,556 | 1/1993 | Turner | 370/94.1 |
| 5,179,558 | 1/1993 | Thacker et al. | 370/94.3 |
| 5,185,743 | 2/1993 | Murayama et al. | 370/110.1 |
| 5,191,582 | 3/1993 | Upp | 370/94.1 |
| 5,191,652 | 3/1993 | Dias et al. | 395/200 |
| 5,193,151 | 3/1993 | Jain | 395/200 |
| 5,197,067 | 3/1993 | Fujimoto et al. | 370/94.1 |
| 5,198,808 | 3/1993 | Kudo | 340/825.8 |
| 5,199,027 | 3/1993 | Barri | 370/60 |
| 5,239,539 | 8/1993 | Uchida et al. | 370/58.3 |
| 5,253,247 | 10/1993 | Hirose et al. | 370/14 |
| 5,253,248 | 10/1993 | Dravida et al. | 370/16 |
| 5,255,264 | 10/1993 | Cotton et al. | 370/24 |
| 5,255,266 | 10/1993 | Watanabe et al. | 370/60.1 |
| 5,257,311 | 10/1993 | Naito et al. | 380/48 |
| 5,258,979 | 11/1993 | Oomuro et al. | 370/95.1 |
| 5,265,088 | 11/1993 | Takigawa et al. | 370/15 |
| 5,267,232 | 11/1993 | Katsube et al. | 370/17 |
| 5,268,897 | 12/1993 | Komine et al. | 370/60 |
| 5,271,010 | 12/1993 | Miyake et al. | 370/94.1 |
| 5,272,697 | 12/1993 | Fraser et al. | 370/61 |
| 5,274,641 | 12/1993 | Shobatake et al. | 370/94.1 |
| 5,274,768 | 12/1993 | Traw et al. | 395/275 |
| 5,280,469 | 1/1994 | Taniguchi et al. | 370/13 |
| 5,280,470 | 1/1994 | Buhrke et al. | 370/13 |
| 5,282,201 | 1/1994 | Frank et al. | 370/94.1 |
| 5,283,788 | 2/1994 | Morita et al. | 370/110.1 |
| 5,285,446 | 2/1994 | Yonehara | 370/60.1 |
| 5,287,349 | 2/1994 | Hyodo et al. | 370/60.1 |
| 5,287,535 | 2/1994 | Sakagawa et al. | 370/60 |
| 5,289,462 | 2/1994 | Ahmadi et al. | 370/60.1 |
| 5,289,463 | 2/1994 | Mobasser | 370/68.1 |
| 5,289,470 | 2/1994 | Chang et al. | 370/94.1 |
| 5,291,481 | 3/1994 | Doshi et al. | 370/79 |
| 5,291,482 | 3/1994 | McHarg et al. | 370/60 |
| 5,295,134 | 3/1994 | Yoshimura et al. | 370/16 |
| 5,301,055 | 4/1994 | Bagchi et al. | 359/139 |
| 5,301,184 | 4/1994 | Uriu et al. | 370/60 |
| 5,301,190 | 4/1994 | Tsukuda et al. | 370/66 |
| 5,301,193 | 4/1994 | Toyofuku et al. | 370/94.1 |
| 5,303,232 | 4/1994 | Faulk, Jr. | 370/94 |
| 5,305,311 | 4/1994 | Lyles | 370/60 |
| 5,309,431 | 5/1994 | Tominaga et al. | 370/60 |
| 5,309,438 | 5/1994 | Nakajima | 370/94.1 |
| 5,311,586 | 5/1994 | Bogart et al. | 379/221 |
| 5,313,454 | 5/1994 | Bustini et al. | 370/13 |
| 5,313,458 | 5/1994 | Suzuki | 370/56 |
| 5,315,586 | 5/1994 | Charvillat | 370/60 |
| 5,319,638 | 6/1994 | Lin | 370/60 |
| 5,321,695 | 6/1994 | Proctor et al. | 370/60 |
| 5,323,389 | 6/1994 | Bitz et al. | 370/60.1 |
| 5,333,131 | 7/1994 | Tanabe et al. | 370/54 |
| 5,333,134 | 7/1994 | Ishibashi et al. | 370/94.1 |
| 5,335,222 | 8/1994 | Kamoi et al. | 370/60 |
| 5,335,325 | 8/1994 | Frank et al. | 395/200 |
| 5,339,310 | 8/1994 | Taniguchi | 370/60 |
| 5,339,317 | 8/1994 | Tanaka et al. | 370/85.15 |
| 5,339,318 | 8/1994 | Tanaka et al. | 370/110.1 |
| 5,341,366 | 8/1994 | Soumiya et al. | 370/17 |
| 5,341,373 | 8/1994 | Ishibashi et al. | 370/85.9 |
| 5,341,376 | 8/1994 | Yamashita | 370/99 |
| 5,345,229 | 9/1994 | Olnowich et al. | 340/825.8 |
| 5,350,906 | 9/1994 | Brody et al. | 235/379 |
| 5,355,372 | 10/1994 | Sengupta et al. | 370/60 |
| 5,357,506 | 10/1994 | Sugawara | 370/60 |
| 5,357,507 | 10/1994 | Hughes et al. | 370/60 |
| 5,357,508 | 10/1994 | Le Boudec et al. | 370/58.3 |
| 5,357,510 | 10/1994 | Norizuki et al. | 370/60.1 |
| 5,359,600 | 10/1994 | Ueda et al. | 370/60.1 |
| 5,361,251 | 11/1994 | Aihara et al. | 370/60 |
| 5,361,372 | 11/1994 | Rege et al. | 395/800 |
| 5,363,433 | 11/1994 | Isono | 379/92 |
| 5,365,514 | 11/1994 | Hershey et al. | 370/17 |
| 5,371,893 | 12/1994 | Price et al. | 395/725 |
| 5,373,504 | 12/1994 | Tanaka et al. | 370/60.1 |
| 5,375,117 | 12/1994 | Morita et al. | 370/79 |
| 5,377,262 | 12/1994 | Bales et al. | 379/220 |
| 5,377,327 | 12/1994 | Jain et al. | 395/200 |
| 5,379,297 | 1/1995 | Glover et al. | 370/60.1 |
| 5,379,418 | 1/1995 | Shimazaki et al. | 395/575 |
| 5,390,170 | 2/1995 | Sawant et al. | 370/58.1 |
| 5,390,174 | 2/1995 | Jugel | 370/60 |
| 5,390,175 | 2/1995 | Hiller et al. | 370/60 |
| 5,392,280 | 2/1995 | Zheng | 370/60 |
| 5,392,402 | 2/1995 | Robrock, II | 395/200 |
| 5,394,396 | 2/1995 | Yoshimura et al. | 370/60 |
| 5,394,397 | 2/1995 | Yanagi et al. | 370/60.1 |
| 5,398,235 | 3/1995 | Tsuzuki et al. | 370/16 |
| 5,400,337 | 3/1995 | Munter | 370/60.1 |
| 5,402,415 | 3/1995 | Turner | 370/390 |
| 5,412,648 | 5/1995 | Fan | 370/60 |
| 5,414,703 | 5/1995 | Sakaue et al. | 370/60 |
| 5,420,858 | 5/1995 | Marshall et al. | 370/60.1 |
| 5,420,988 | 5/1995 | Elliott | 395/275 |
| 5,422,879 | 6/1995 | Parsons et al. | 370/60 |
| 5,425,021 | 6/1995 | Derby et al. | 370/54 |
| 5,425,026 | 6/1995 | Mori | 370/60 |
| 5,432,713 | 7/1995 | Takeo et al. | 364/514 |
| 5,432,784 | 7/1995 | Ozveren | 370/79 |
| 5,432,785 | 7/1995 | Ahmed et al. | 370/79 |
| 5,432,908 | 7/1995 | Heddes et al. | 395/250 |
| 5,436,886 | 7/1995 | McGill | 370/16 |
| 5,436,893 | 7/1995 | Barnett | 370/60 |
| 5,440,547 | 8/1995 | Easki et al. | 370/60 |
| 5,444,702 | 8/1995 | Burnett et al. | 370/60.1 |

| | | | |
|---|---|---|---|
| 5,446,733 | 8/1995 | Tsuruoka | 370/60.1 |
| 5,446,737 | 8/1995 | Cidon et al. | 370/85.5 |
| 5,446,738 | 8/1995 | Kim et al. | 370/94.2 |
| 5,448,559 | 9/1995 | Hayter et al. | 370/60.1 |
| 5,450,406 | 9/1995 | Esaki et al. | 370/60.1 |
| 5,452,296 | 9/1995 | Shimizu | 370/60.1 |
| 5,455,820 | 10/1995 | Yamada | 370/17 |
| 5,455,825 | 10/1995 | Lauer et al. | 370/60 |
| 5,457,687 | 10/1995 | Newman | 370/79 |
| 5,459,743 | 10/1995 | Fukuda et al. | 371/67.1 |
| 5,461,611 | 10/1995 | Drake, Jr. et al. | 370/54 |
| 5,463,620 | 10/1995 | Sriram | 370/60 |
| 5,465,331 | 11/1995 | Yang et al. | 395/200.08 |
| 5,475,679 | 12/1995 | Munter | 370/412 |
| 5,479,401 | 12/1995 | Bitz et al. | 370/60.1 |
| 5,479,402 | 12/1995 | Hata et al. | 370/60.1 |
| 5,483,526 | 1/1996 | Ben-Nun et al. | 370/60.1 |
| 5,485,453 | 1/1996 | Wahlman et al. | 370/16 |
| 5,485,455 | 1/1996 | Dobbins et al. | 370/60 |
| 5,487,063 | 1/1996 | Kakuma et al. | 370/56 |
| 5,488,606 | 1/1996 | Kakuma et al. | 370/16 |
| 5,491,691 | 2/1996 | Shtayer et al. | 370/61 |
| 5,491,694 | 2/1996 | Oliver et al. | 370/85.4 |
| 5,493,566 | 2/1996 | Ljungberg et al. | 370/60 |
| 5,497,369 | 3/1996 | Wainwright | 370/60 |
| 5,499,238 | 3/1996 | Shon | 370/60.2 |
| 5,504,741 | 4/1996 | Yamanaka et al. | 370/58.2 |
| 5,504,742 | 4/1996 | Kakuma et al. | 370/60.1 |
| 5,506,834 | 4/1996 | Sekihata et al. | 370/17 |
| 5,506,839 | 4/1996 | Hatta | 370/60 |
| 5,506,956 | 4/1996 | Cohen | 395/182.04 |
| 5,509,001 | 4/1996 | Tachibana et al. | 370/17 |
| 5,509,007 | 4/1996 | Takashima et al. | 370/60.1 |
| 5,513,134 | 4/1996 | Cooperman et al. | 365/49 |
| 5,513,178 | 4/1996 | Tanaka | 370/58.2 |
| 5,513,180 | 4/1996 | Miyake et al. | 370/60.1 |
| 5,515,359 | 5/1996 | Zheng | 370/13 |
| 5,517,495 | 5/1996 | Lund et al. | 370/60 |
| 5,519,690 | 5/1996 | Suzuka et al. | 370/17 |
| 5,521,905 | 5/1996 | Oda et al. | 370/17 |
| 5,521,915 | 5/1996 | Dieudonne et al. | 370/60.1 |
| 5,521,916 | 5/1996 | Choudhury et al. | 370/60.1 |
| 5,521,917 | 5/1996 | Watanabe et al. | 370/1 |
| 5,521,923 | 5/1996 | Willmann et al. | 370/94.1 |
| 5,523,999 | 6/1996 | Takano et al. | 370/58.2 |
| 5,524,113 | 6/1996 | Gaddis | 370/60.1 |
| 5,526,344 | 6/1996 | Diaz et al. | 370/16 |
| 5,528,588 | 6/1996 | Bennett et al. | 370/60 |
| 5,528,590 | 6/1996 | Iidaka et al. | 370/60.1 |
| 5,528,591 | 6/1996 | Lauer | 370/79 |
| 5,530,695 | 6/1996 | Dighe et al. | 370/17 |
| 5,533,009 | 7/1996 | Chen | 370/17 |
| 5,533,020 | 7/1996 | Byrn et al. | 370/60.1 |
| 5,535,196 | 7/1996 | Aihara et al. | 370/60 |
| 5,535,197 | 7/1996 | Cotton | 370/60 |
| 5,537,394 | 7/1996 | Abe et al. | 370/17 |
| 5,541,912 | 7/1996 | Choudhury et al. | 370/17 |
| 5,544,168 | 8/1996 | Jeffrey et al. | 370/60.1 |
| 5,544,169 | 8/1996 | Norizuki et al. | 370/60.1 |
| 5,544,170 | 8/1996 | Kasahara | 370/84 |
| 5,546,389 | 8/1996 | Wippenbeck et al. | 370/60 |
| 5,546,391 | 8/1996 | Hochschild et al. | 370/60 |
| 5,546,392 | 8/1996 | Boal et al. | 370/60.1 |
| 5,550,821 | 8/1996 | Akiyoshi | 370/60.1 |
| 5,550,823 | 8/1996 | Irie et al. | 370/60.1 |
| 5,553,057 | 9/1996 | Nakayama | 370/13 |
| 5,553,068 | 9/1996 | Aso et al. | 370/60 |
| 5,555,243 | 9/1996 | Kakuma et al. | 370/58.2 |
| 5,555,265 | 9/1996 | Kakuma et al. | 370/60 |
| 5,557,607 | 9/1996 | Holden | 370/58.2 |
| 5,568,479 | 10/1996 | Watanabe et al. | 370/60.1 |
| 5,570,361 | 10/1996 | Norizuki et al. | 370/60.1 |
| 5,570,362 | 10/1996 | Nishimura | 370/60.1 |
| 5,572,522 | 11/1996 | Calamvokis et al. | 370/60.1 |
| 5,577,032 | 11/1996 | Sone et al. | 370/58.3 |
| 5,577,035 | 11/1996 | Hayter et al. | 370/395 |
| 5,583,857 | 12/1996 | Soumiya et al. | 370/233 |
| 5,583,858 | 12/1996 | Hanaoka | 370/392 |
| 5,583,861 | 12/1996 | Holden | 370/395 |
| 5,590,132 | 12/1996 | Ishibashi et al. | 370/236 |
| 5,602,829 | 2/1997 | Nie et al. | 370/235 |
| 5,610,913 | 3/1997 | Tomonaga et al. | 370/219 |
| 5,623,405 | 4/1997 | Isono | 395/230 |
| 5,625,846 | 4/1997 | Kobayakawa et al. | 395/872 |
| 5,633,861 | 5/1997 | Hanson et al. | 370/232 |
| 5,689,506 | 11/1997 | Chiussi et al. | 370/412 |

OTHER PUBLICATIONS

Douglas H. Hunt, *ATM Traffic Management—Another Perspective*, Business Communications Review, Jul. 1994.

Richard Bubenik et al., *Leaf Initiated Join Extensions*, Technical Committee, Signalling Subworking Group, ATM Forum/94–0325R1, Jul. 1, 1994.

Douglas H. Hunt et al., *Flow Controlled Virtual Connections Proposal for ATM Traffic Management (Revision R2)*, Traffic Management Subworking Group, ATM_Forum/94–0632R2, Aug. 1994.

Flavio Bonomi et al., *The Rate–Based Flow Control Framework for the Available Bit Rate ATM Service*, IEEE Network, Mar./Apr. 1995, pp. 25–39.

R. Jain, *Myths About Congestion Management in High Speed Networks*, Internetworking Research and Experience, vol. 3, 101–113 (1992).

Douglas H. Hunt et al., *Credit Based FCVC Proposal for ATM Traffic Management (Revision R1)*, ATM Forum Technical Committee Traffic Management Subworking Group, ATM_Forum/94–0168R1, Apr. 28, 1994.

Douglas H. Hunt et al., *Action Item Status for Credit–Based FCVC Proposal*, ATM Forum Technical Committee Traffic Management Subworking Group, ATM_Forum/94–0439, Apr. 28, 1994.

Timothy P. Donahue et al., *Arguments in Favor of Continuing Phase 1 as the initial ATM Forum P–NNI Routing Protocol Implementation*, ATM Forum Technical Committee, ATM Forum/94–0460, Apr. 28, 1994.

Richard Bubenick et al., *Leaf Initiated Join Extensions*, Technical Committee, Signalling Subworking Group, ATM Forum/94–0325, Apr. 28, 1994.

Rob Coltun et al., *PRP: A P–NNI Routing Protocol Proposal*, ATM Forum Technical Committee, ATM_Forum/94–0492, Apr. 28, 1994.

Richard Bubenik et al., *Leaf Initiated Join Extensions*, ATM Forum Technical Committee, Signalling Subworking Group, ATM Forum 94–0325, Apr. 28, 1994.

Richard Bubenik et al., *Requirements For Phase 2 Signalling Protocol*, ATM Forum Technical Committee, Signalling Subworking Group, ATM Forum 94–1078, Jan. 1, 1994.

SITA, ATM RFP: C–Overall Technical Requirements, Sep. 1994.

H.T. Kung and K. Chang, *Receiver–Oriented Adaptive Buffer Allocation in Credit–Based Flow Control for ATM Networks,* Proceedings of INFOCOM '95, Apr. 2–6, 1995, pp. 1–14.

H.T. Kung et al., *Credit–based Flow Control For ATM Networks: Credit Update Protocol, Adaptive Credit Allocation, and Statistical Multiplexing,* Proceedings of ACM SIGCOMM '94 Symposium on Communications Architectures, Protocols and Applications, Aug. 31–Sep. 2, 1994, pp. 1–14.

*Head of Line Arbitration in ATM Switches With Input–Output Buffering and Backpressure Control.* By Hosein F. Badran and H. T. Mouftah, *Globecom* '91, pp. 0347–0351.

NETWORK SWITCH UTILIZING CENTRALIZED AND PARTITIONED MEMORY FOR CONNECTION TOPOLOGY INFORMATION STORAGE

RELATED CASE INFORMATION

This application claims benefit of U.S. provisional application Ser. No. 60/001,498, filed Jul. 19, 1995.

FIELD OF THE INVENTION

The present invention relates generally to networks and, more particularly, to a network switch having centralized and partitioned memory for storing connection topology information.

BACKGROUND OF THE INVENTION

Networks such as asynchronous transfer mode ("ATM") networks are used to transfer audio, video and other data. ATM networks deliver data by routing data units, such as ATM cells, from source to destination through switches. Switches include input/output ("I/O") ports through which ATM cells are received and transmitted. Each of the I/O ports, in turn, has at least one queue associated therewith for temporarily storing, or buffering cells processed by the respective port. Queues associated with an input port are referred to herein as input port queues and queues associated with an output port are referred to herein as output port queues.

Cells and control signals may be transmitted from an input port queue to a single output port queue in the case of point to point connections or from an input port queue to a selected group of output port queues in the case of point to multipoint connections. Prior to transmitting a cell from an input port queue to a destination output port queue, or queues, a control signal is sent from the input port to the destination output port, or ports, to query whether sufficient output port queue space is available to enqueue the cell.

In accordance with one type of ATM transmission, which may be referred to as "per-VC queuing", the cell header identifies the input port queue which temporarily stores the cell. In this way, the header also identifies the destination output port queue, or queues, since the cells stored in a particular input port queue have the same destination output port queue, or queues.

The ATM switch requires memory for storing a look-up table containing connection topology information (i.e., the destination output port queue, or queues associated with each input port queue). As the number of input and output ports increases, the size and bandwidth requirements of the connection topology memory likewise increase. Additionally, scaling the number of ports of the switch requires an increase in size of the connection topology look-up table.

SUMMARY OF THE INVENTION

Methods and apparatus are described for reducing memory size and bandwidth requirements associated with looking up stored connection topology information in a network switch and for facilitating scaling of the number of ports of the switch. The switch includes at least one input port for receiving data from a network, at least one output port for transmitting data from the switch and a control module including a central switch fabric coupled between the input port and output port. The central switch fabric includes a connection topology memory containing a look-up table correlating the at least one input port to the at least one output port.

With this arrangement, the memory containing the connection topology information is centralized at the switch fabric, thereby facilitating scaling of the number of ports. In particular, the number of input ports or output ports supported by the switch can be increased without modifying the I/O boards containing the I/O ports. Rather, the number of I/O ports can be increased by modifying the centralized connection topology information in the memory at the central switch fabric. This arrangement can be contrasted to maintaining the connection topology memory at the I/O ports themselves, in which case the I/O boards would require increasing or decreasing the size of their memory in order to change the number of switch ports. Moreover, a connection topology memory residing at an input port would be required to have the memory size/bandwidth necessary to perform look-ups for the maximum number of switch output ports, even if it were utilized in a switch with fewer output ports.

The switch further includes at least one input side translator associated with the at least one input port, at least one output side translator associated with the at least one output port and a bandwidth arbiter operative to control data signal flow between the input side translator and the output side translator. At least one input port queue is associated with the input port and at least one output port queue is associated with the output port for temporarily storing data received by the respective output port. The central switch fabric memory is partitioned such that a first connection topology memory is associated with the input side translator and a second connection topology memory is associated with the output side translator.

Each input side translator is associated with a predetermined number of input ports and each output side translator is associated with a predetermined number of output ports. For example, in the illustrative embodiment, each input side translator is associated with up to four input ports and each output side translator is associated with up to four output ports. This arrangement advantageously distributes the bandwidth requirement associated with connection topology memory look-up operations, thereby effectively reducing the necessary memory access bandwidth per device.

Additionally, scaling the number of ports of the switch is facilitated by the disclosed translator/memory/port modularity (i.e., the association of a connection topology memory with each translator and attached ports). In particular, the number of ports can be readily increased with the use of additional translator/memory pairs.

In accordance with a further aspect of the invention, the first connection topology memory associated with the input side translator contains multiqueue number entries, each of which is a list of output port queues associated with a particular input port, and broadcast number entries, each of which is a pointer to one or more multiqueue numbers. A multiqueue number is retrieved from the first connection topology memory for point to point connections and a broadcast number is retrieved from the first connection topology memory for point to multipoint connections. Also stored in the first connection topology memory are bit vector entries which specify the destination output port, or ports. In point to point connections, the bit vector specifies a single output port. The multiqueue number or broadcast number is sent to the output side translator(s) associated with the output port(s) specified by the bit vector. The second connection topology memory associated with the output side translator contains multiqueue numbers for each attached output port. In point to multipoint connections, multiqueue numbers are retrieved from the second connection topology memory in response to a received broadcast number. Multiqueue numbers are further decoded by the particular output port to identify the destination output port queue, or queues.

A multipoint to point connection is a set of multiple point to point connections distributed over time. Hereinafter, wherever point to point is used, it refers to either point to point or multipoint to point unless otherwise noted. A multipoint to multipoint connection is a set of multiple point to multipoint connections distributed over time. Hereinafter, wherever point to multipoint is used, it refers to either point to multipoint or multipoint to multipoint unless otherwise noted.

In point to point connections, the first connection topology memory is accessed to retrieve a multiqueue number and the second connection topology memory is not accessed; whereas, in point to multipoint connections, the first connection topology memory is accessed to retrieve a broadcast number and the second connection topology table memory is accessed to retrieve one or more multiqueue numbers in response to the broadcast number. With this arrangement, access of the second connection topology memory is avoided in point to point connections, thereby reducing the memory size and bandwidth requirements.

BRIEF DESCRIPTION OF THE DRAWINGS

The foregoing features of this invention, as well as the invention itself, may be more fully understood from the following detailed description of the drawings in which.

DESCRIPTION OF THE PREFERRED EMBODIMENT

Figure 1:
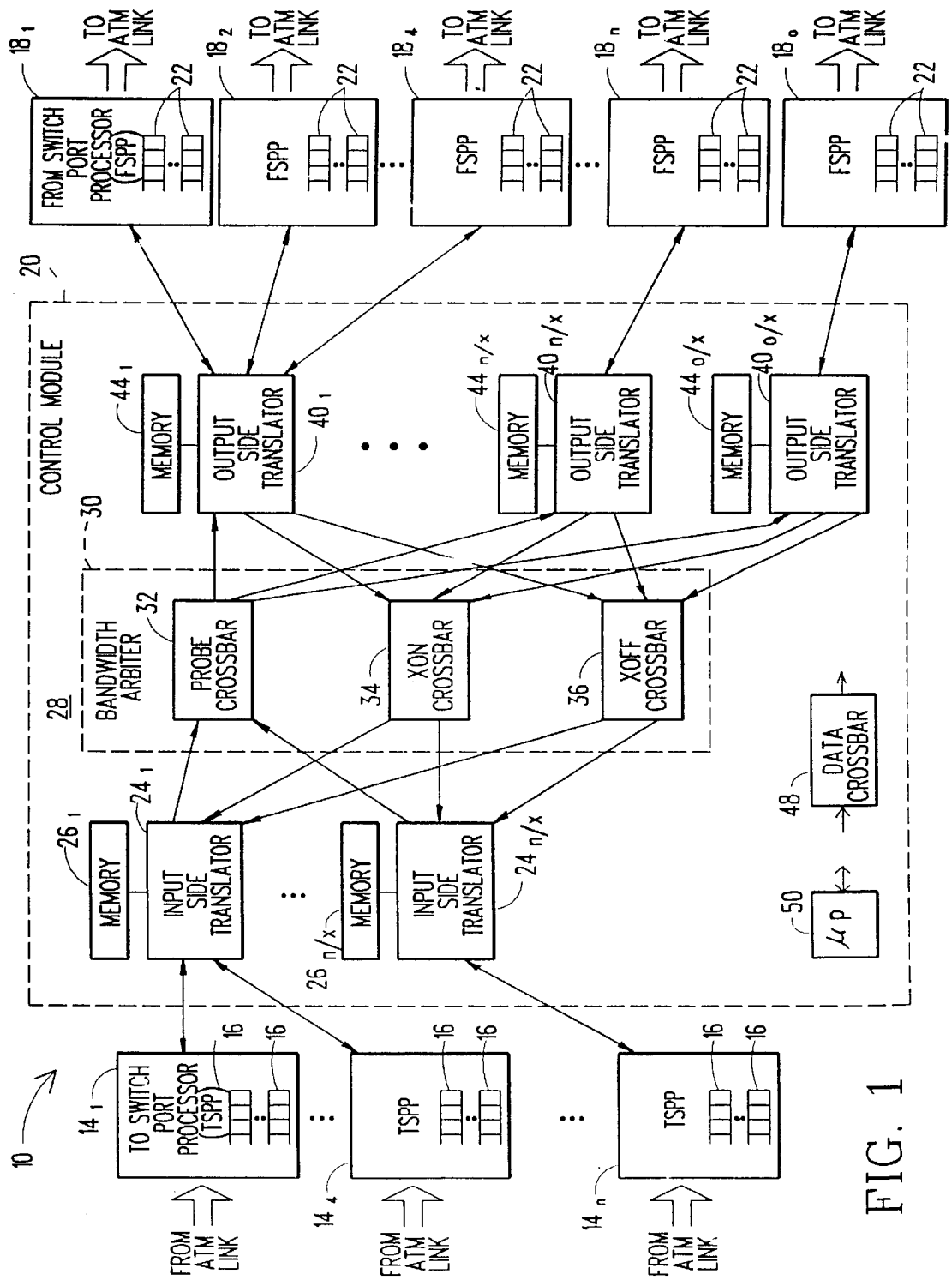
FIG. 1 is a block diagram of a network switch.

Referring to FIG. 1, a network switch 10 includes at least one input port comprising at least one input port processor $14_1$–$14n$ coupled to one or more respective ATM links and operative to receive and temporarily store ATM cells from the respective ATM links. Also provided is at least one output port comprising at least one output port processor $18_1$–$18o$ coupled to one or more respective ATM links and operative to temporarily store and transmit ATM cells to the respective ATM links. The input port processors $14_1$–$14n$ are referred to herein generally as "To Switch Port Processors" or TSPPs 14 and the output port processors $18_1$–$18n$ are referred to herein generally as "From Switch Port Processors" or FSPPs 18.

Each of the I/O ports has at least one queue associated therewith. A queue associated with an input port is referred to herein generally as an input port queue 16 and a queue associated with an output port is referred to herein generally as an output port queue 22. Each input port queue 16 has a corresponding input port queue number identifying the respective input port queue. Likewise, each output port queue 22 has a corresponding output port queue number identifying the respective output port queue.

In one embodiment, the input port queues 16 contain identifiers of other queues which buffer, or temporarily store cells contending for access to a common connection. In such an embodiment, the input port queue 16 may alternatively be referred to as a scheduling list since such a queue contains a list of queues to be scheduled for access to a connection. Alternatively however, the input queues 16 may themselves contain (or point to) cells for the purpose of buffering such cells. It will therefore be appreciated that the term input port queue 16 as used hereinafter refers to either a queue containing other queues or a queue containing cells.

Data and control signals may be transmitted from an input port queue 16 to a particular one of the output port queues 22, in the case of a point to point connection. Alternatively, data and control signals may be transmitted from an input port queue 16 to a selected set of output port queues 22, in the case of a point to multipoint connection.

A multipoint to point connection is a set of multiple point to point connections distributed over time. Hereinafter, wherever point to point is used, it refers to either point to point or multipoint to point unless otherwise noted. A multipoint to multipoint connection is a set of multiple point to multipoint connections distributed over time. Hereinafter, wherever point to multipoint is used, it refers to either point to multipoint or multipoint to multipoint unless otherwise noted.

A control module 20 is coupled between each of the TSPPs $14_1$–$14n$ and the FSPPs $18_1$–$18n$, as shown. The control module 20 includes a central switch fabric 28 which permits the flow of control signals and data between the TSPPs $14_1$–$14n$ and the FSPPs $18_1$–$18n$. The switch fabric 28 includes a plurality of input side translators $24_1$–$24n/x$ (referred to generally as input side translators 24), where x is a predetermined number, such as four. Stated differently, each input side translator 24 is associated with between one and four TSPPs 14. The input side translators 24 connect the respective TSPP(s) 14 to a bandwidth arbiter 30 of the switch fabric and perform translations used to implement internal switch flow control for point to multipoint and point to point connections. The interface between each input side translator 24 and the bandwidth arbiter 30 is provided by serial signal lines.

Also associated with each input side translator $24_1$–$24n/x$ is a connection topology memory $26_1$–$26n/x$, respectively (referred to generally as input side memories 26). Each input side memory 26 includes a look-up table containing connection topology information and thus, may be referred to alternatively as a look-up table memory 26. In the illustrative embodiment, each input side memory 26 contains a look-up table of multiqueue numbers (MQNs), forward broadcast numbers (FBCNs), input port queue numbers and bit vectors, as will be described.

Also provided in the switch fabric 28 are a plurality of output side translators $40_1$–$40o/x$ (referred to generally as output side translators 40), where x is a predetermined number, such as four. Thus, each output side translator 40 is associated with between one and four FSPPs 18. Like the input side translators 24, the output side translators 40 are connected to the bandwidth arbiter 30 via serial signal lines and perform translations for internal switch flow control.

A connection topology memory $44_1$–$44o/x$ (referred to generally as output side memories 44) is associated with each output side translator $40_1$–$40o/x$, respectively. Each of the output side memories 44 includes a look-up table containing connection topology information and thus, may be referred to alternatively as a look-up table memory 44. In the illustrative embodiment, each output side memory 44 contains a look-up table of input port queue numbers and reverse broadcast numbers (RBCNs), as will be described.

The bandwidth arbiter 30 controls data flow within the switch 10 and includes a probe crossbar 32, an XOFF crossbar 36 and an XON crossbar 34, each of which is an NxN switch fabric, such as a cross point switch fabric. Multiple request messages, or probe control signals, flow through the probe crossbar 32. The request message is used to query whether or not sufficient space is available at the destination output port queue, or queues 22 to enqueue a cell. The request message is considered a "forward" control signal since its direction is from a TSPP 14 to one or more FSPPs 18 (i.e., the same direction as data). A two bit control signal flows in the reverse direction (from one or more FSPPs 18 to a TSPP 14) through the XOFF crossbar 36 and responds to the request message query by indicating whether or not the destination output port queue, or queues 22 are presently capable of accepting data cells and thus, whether or not the transmitting TSPP 14 can transmit cells. In the event that the XOFF control signal indicates that the queried output port queue(s) 22 are not presently capable of receiving data, another reverse control signal, which flows through the XON crossbar 34, notifies the transmitting TSPP(s) 14 once space becomes available at the destination output port queue(s) 22.

A data crossbar 48 of the switch fabric 28 permits transmission of data cells between the TSPPs 14 and the FSPPs 18. To this end, the data crossbar 48 is coupled between the TSPPs 14 and FSPPs 18. A microprocessor 50 within the control module 20 provides various control functionality. As one example, the microprocessor 50 executes call control software when switch connections are set up, in order to load the connection topology look-up tables into the input side memories 26 and output side memories 44.

In one embodiment, each of the TSPPs 14 and FSPPs 18 resides on a respective I/O board and the control module 20 is implemented on a central board. In the preferred embodiment, the input side translators 24 and output side translators 40 are implemented on an ASIC, which may contain one or more of the input and output side translators. Additionally, the bandwidth arbiter 30 is implemented on an ASIC. Each input side memory 26 and output side memory 44 is provided by a dedicated SRAM device.

Preferably, the input side translators 24 and output side translators 40 are incorporated into the same device. Similarly, the input side memories 26 and output side memories 44 are interleaved on the same device. To this end, both the input side memories 26 and output side memories 44 contain similar connection topology look-up tables. Specifically, each of the memories 26, 44 contains a connection topology look-up table with entries of multiqueue numbers (MQNs), forward broadcast numbers (FBCNs), bit vectors, input port queue numbers and reverse broadcast numbers (RBCNs).

An MQN is a fourteen bit digital word which specifies one or more output port queues 22 associated with a particular FSPP 18. In point to point connections, an MQN for the destination FSPP 18 is retrieved from the input side memory 26 by the input side translator 24 and is sent to the destination FSPP 18 via the output side translator 40 and bandwidth arbiter 30.

An FBCN is a seventeen bit digital word which points to a list of one or more MQNs. In point to multipoint connections, an FBCN is retrieved from the input side connection topology memory 26 by the respective input side translator 24 and is sent to the output side translator(s) 40 associated with the destination FSPP(s) 18. The output side translator(s) 40 then use the FBCN to retrieve an MQN for each destination FSPP 18. In the case of point to point connections however, no connection topology look-up operations are performed on the output side of the switch fabric 28, since an MQN is transmitted directly from the input side of the switch fabric. Thus, fewer connection topology look-up operations are performed in the case of point to point connections, as contrasted to point to multipoint connections. That is, in point to point connections, an MQN is transmitted directly to the output side, as contrasted to transmission of an FBCN to be translated into MQN(s) by the output side. With this arrangement, the necessary memory size is reduced for point to point connections.

In the illustrative embodiment, a bit vector is a sixteen bit digital word which specifies the destination FSPP(s) 18, with the number of bits corresponding to the number of output ports. A bit vector is retrieved from the input side look-up table memory 26 by the respective input side translator 24 in both point to point and point to multipoint connections. However, only one bit of the bit vector is set for point to point connections. In the illustrative embodiment, bit vectors are not used for transmissions in the reverse direction. Rather, reverse transmissions are either to a single TSPP or to all TSPPs 14. In the case of a reverse transmission to all TSPPs, an RBCN, which is a seventeen bit digital word which points to a list of input port queue numbers, is retrieved from an output side memory 44. Alternatively, in the case of a reverse transmission to one TSPP 14, an input port queue number and the input port number associated with the destination TSPP 14 is retrieved from the output side memory 44.

The following Table 1 summarizes the connection topology look-up operations performed by the input and output side translators 24, 40 for both forward probe control signal transmissions and reverse XON and XOFF control signal transmissions in point to point and point to multipoint connections.

TABLE 1

Input side translator look-up operations for forward signals:
 1. Input port queue #: FBCN or MQN (an FBCN for point to multipoint connections and an MQN for point to point connections)
 2. Input port queue #: Bit Vector
Output side translator look-up operation for forward signals:
 3. FBCN: MQNs
Output side translator look-up operations for reverse signals:
 4. Output port queue#: Input port queue# and Input Port# or RBCN (input port queue# for point to point connections and an RBCN for point to multipoint connections)
Input side translator look-up operation for reverse signals:
 5. RBCN: Input port queue #

With the above described arrangement, the connection topology memory (including the discrete input side memories 26 associated with respective input side translators 24 and output side memories 44 associated with respective output side translators 40) is centralized at the switch fabric 28 of the control module 20. This look-up memory centralization facilitates switch port scaling (i.e., changes in the number of ports of the switch). In particular, in the event that it is desired to increase the number of input ports or output ports supported by the switch 10, it is not necessary to modify the I/O boards on which the TSPP/FSPP resides. Rather, I/O port capacity can be increased by modifying the centralized connection topology information contained in the switch fabric memories 26, 44. This arrangement can be contrasted to having the look-up table memory reside at the TSPPs 14 and FSPPs 18 which would require a change in size of their local look-up table memory in order to modify the number of switch ports. Also, a connection topology memory residing at an input port would be required to have the memory size/bandwidth necessary to perform connection topology look-ups for the maximum number of switch output ports, even if it were utilized in a switch with fewer output ports.

A further advantage of the switch 10 is provided by the association of a predetermined number of ports with each translator 24, 40 and the partitioning of the connection topology memory, such that each input side translator 24 and output side translator 40 has a dedicated connection topology memory 26, 44, respectively, associated therewith. In particular, in the illustrative embodiment, each input side translator 24/input side memory 26 combination is associated with up to four TSPPs 14 and each output side translator 40/output side memory 44 combination is associated with up to four FSPPs 18. This arrangement serves to distribute the bandwidth requirement associated with connection topology look-up operations. Additionally, switch modularity is facilitated since the number of ports can be readily increased by adding additional translator/memory pairs to the switch fabric 28. For example, input/output port quantity can be increased by adding additional input side translators 24 and associated input side memories 26.

Figure 2:
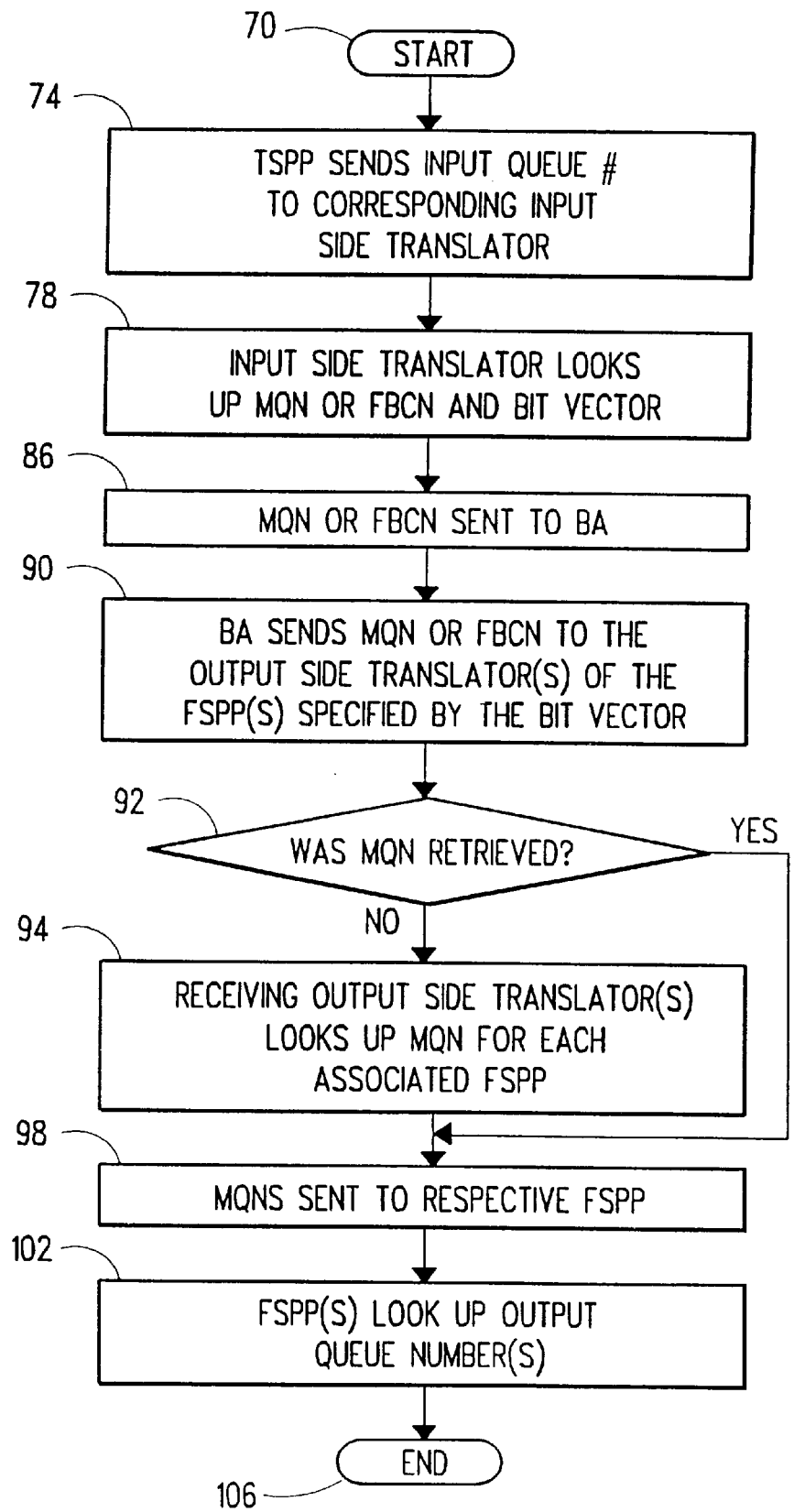
FIG. 2 is a flow diagram of an illustrative process by which one or more destination output port queues are identified.

Referring also to FIG. 2, the process by which one or more output port queues 22 are identified for receipt of control signals and data from a particular input port queue 16 will be described. After the process commences in step 70, a TSPP 14 sends the number of the associated input port queue 16 containing data (i.e., or containing queues containing data) to the attached input side translator 24 in step 74. In step 78, the input side translator 24 accesses the corresponding input side memory 26. In particular, the input port queue number is used to address the input side memory 26 to retrieve a bit vector and either an FBCN or an MQN, depending on whether the cell connection is point to point or point to multipoint. In the case of a point to point connection, the input side translator 24 retrieves an MQN and, in the case of a point to multipoint connection, the input side translator 24 retrieves an FBCN.

In subsequent step 86, the retrieved MQN or FBCN is sent by the input side translator 24 to the bandwidth arbiter 30. Subsequently, in step 90, the bandwidth arbiter 30 sends the MQN or FBCN to the output side translator(s) 40 associated with the FSPPs 18 specified by the bit vector. In step 92, it is determined by the receiving output side translator 40 whether an MQN was retrieved by the input side translator 24. In the event that an MQN was not retrieved, then an FBCN was retrieved (i.e., a point to multipoint connection) and a further look-up operation is performed by the output side translator(s) 40 to which the FBCN is transmitted. In particular, in step 94, the receiving output side translator(s) 40 perform the further look-up of retrieving an MQN for each attached FSPP 18 in response to the received FBCN. The MQNs retrieved by the output side translator(s) 40 are then sent to the respective FSPPs 18, in step 98. Note that, in the event that an MQN was retrieved by the input side translator 24 in step 78 (i.e., a point to point connection), that MQN is sent to the respective FSPP in step 98. Stated differently, there is no output side connection topology look-up operation for point to point connections. Finally, in step 102, the destination FSPP(s) 18 look up the associated output port queue numbers 22 indicated by the received MQN before the process is terminated in step 106.

Figure 3:
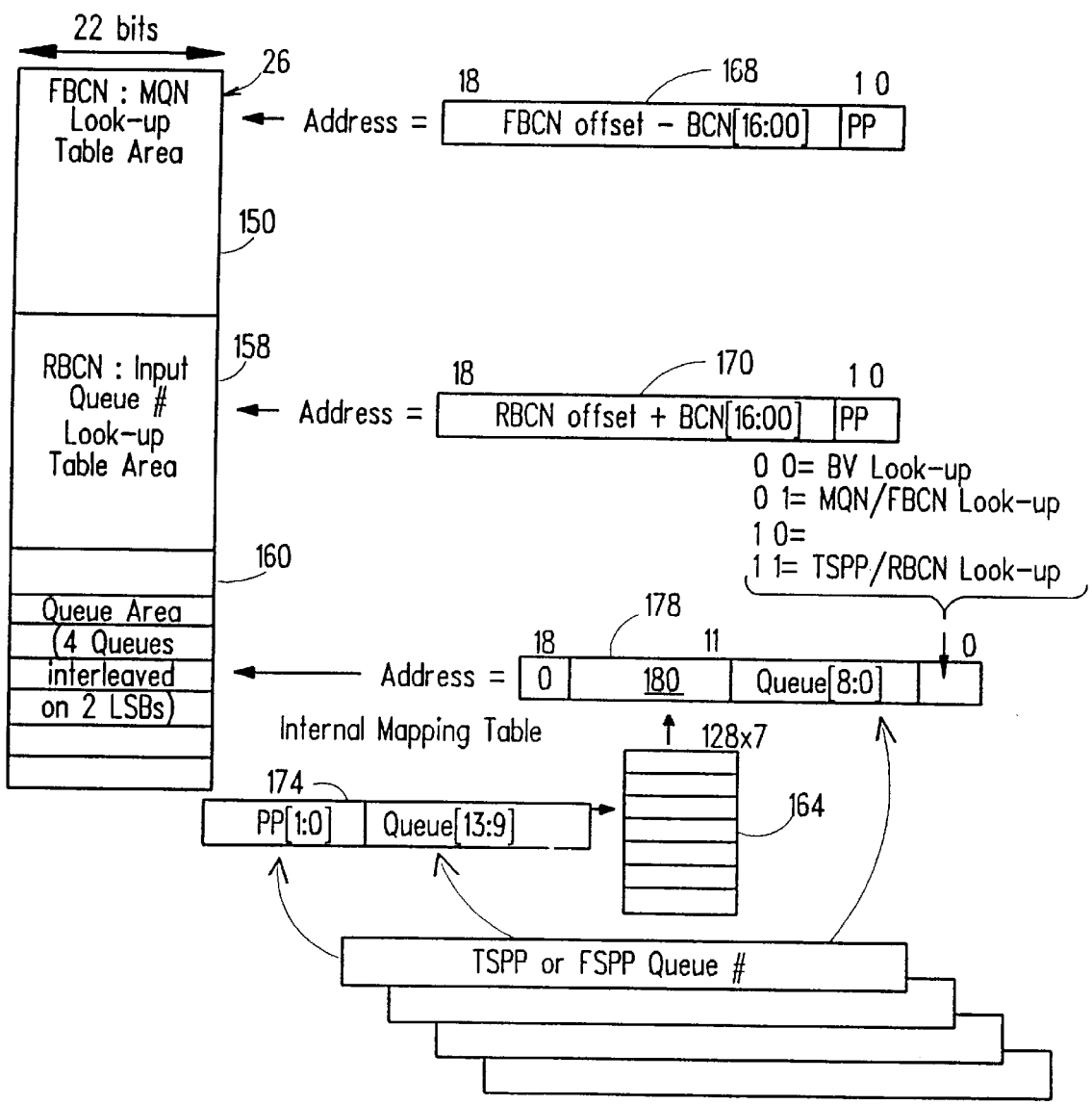
FIG. 3 is a diagram of an illustrative connection topology memory and mapping memory of the switch of FIG. 1, as well as the address structures associated with the connection topology memory and the mapping memory.

Referring also to FIG. 3, the structure of the connection topology memories 26, 44 is shown in conjunction with illustrative input side memory 26. In the illustrative embodiment, the connection topology memory 26 is a twenty-two bit wide SRAM segregated into three areas 150, 158 and 160.

The first memory area 150 (referred to as the FBCN:MQN look-up table area) is accessed to perform output side look-up for forward point to multipoint transmissions (i.e., during the look-up operation numbered 3 in Table 1). To this end, the FBCN:MQN look-up table area 150 contains entries correlating each FBCN to a list of MQNs. The second memory area 158 (referred to as the RBCN:Input Port Queue # look-up table area) is accessed to perform input side look-up for reverse point to multipoint transmissions (i.e., during the look-up operation numbered 5 in Table 1). Thus, the RBCN:Input Port Queue number look-up table area 158 contains entries correlating each RBCN to a list of input queue numbers.

The third memory area 160 (referred to as the queue area) is accessed to perform input side look-up operations for forward and reverse point to point and point to multipoint connections (i.e., during the look-up operations numbered 1, 2 and 4 in Table 1). Thus, queue area 160 contains three types of entries: (1) entries correlating an input port queue number to an FBCN or an MQN; (2) entries correlating an input port queue number to a bit vector; and (3) entries correlating an output port queue number to input port queue number(s) and the input port number or an RBCN. Each FBCN/MQN entry contains a bit specifying whether the entry is an FBCN or an MQN (i.e., whether the connection is point to multipoint or point to point, respectively). The bit vector is a sixteen bit entry specifying the destination FSPP(s) 18. Thus, in the case of a point to point connection, only one bit of the bit vector is set. Each input port queue number/RBCN entry contains a bit specifying whether the entry is an input port queue number and input port number or an RBCN (i.e., whether the connection is point to point or point to multipoint).

Two of the connection topology look-up operations are achieved using the port processor (TSPP 14 or FSPP 18) number for addressing. In particular, looking up an MQN in response to an FBCN in the table area 150 (i.e., look-up operation 3 in Table 1) and looking up an input port queue number in response to an RBCN in the table area 158 (i.e., look-up operation 5 in Table 1) are achieved using the particular port processor number for addressing. Specifically, the memory address used to look up an MQN in response to an FBCN is labelled 168, in which the two least significant bits identify the receiving FSPP 18. The most significant seventeen bits are given by an FBCN offset register value minus the FBCN. The FBCN offset corresponds to the end of the memory 26 (i.e., the last memory location). The address used to look up an input port queue number in response to an RBCN is labelled 170 and includes the receiving TSPP identifier as the two least significant bits. The most significant seventeen bits are given by an RBCN offset register value plus the RBCN. The RBCN offset corresponds to the end of the queue area 160.

The RBCN offset is programmable providing a trade-off between the size of the queue area 160 and the size of the BCN look-up table area. This allows flexibility in choosing between the number of connections and the percent of connections which are multipoint. Additionally, the look-up area for the FBCN grows down within the memory; whereas the look-up area for the RBCN grows up, so that the portion of memory dedicated to point to multipoint information as compared to multipoint to point information does not have to be established at machine initialization time.

The remaining look-up operations (numbered 1, 2 and 4 in Table 1) utilize a memory mapping scheme in order to optimize memory utilization. These look-up operations include: (1) looking up a bit vector in response to an input port queue number (i.e., numbered 2 in Table 1); (2) looking up either an MQN or an FBCN in response to an input port queue number (i.e., numbered 1 in Table 1) and (3) looking up either an input port queue number and input port number or an RBCN in response to an output port queue number (i.e., numbered 4 in Table 1).

Each input side translator 24 and output side translator 40 contains a mapping RAM 164. The address to the mapping RAM 164 is labelled 174 and includes the least significant bits of the port processor number (i.e., TSPP or FSPP) and the most significant bits of the input/output port queue number, depending on the particular look-up operation. For example, in the case of looking up a bit vector in response to an input port queue number, the port processor number identifies the transmitting TSPP 14 and the queue number identifies the particular input port queue 16. The two least significant bits of the port processor number are used in address 174 since each translator supports four port processors. The five most significant bits of the I/O port queue number are used in address 174 since the page size is 512 (i.e., nine bits) and the queue number is fourteen bits with all of the bits resolved.

The mapping address 174 is used to retrieve a seven bit mapping word 180 from the mapping RAM 164 for use in an address 178 to access the queue area 160 of the external SRAM 26. The seven bit mapping word 180 specifies a particular page of 128 pages into which the queue area 160 is divided. The queue area address 178 additionally includes the transmitting port queue number (i.e., an input port queue number 16 when looking up an MQN, bit vector or FBCN and an output port queue number 22 when looking up an RBCN or input port queue number 16). The two least significant bits of the queue area address 178 are look-up selection bits which specify the particular one of the three types of look-ups which utilize the queue area 160 (i.e., look-up operations labelled 1, 2 and 4 in Table 1). In particular, 00 as the two least significant bits of address 178 specifies a bit vector look-up operation, 01 as the two least significant bits specifies an MQN or FBCN look-up operation and 11 as the two least significant bits specifies an input port queue number and input port number or RBCN look-up operation. An entry of 10 as the two least significant bits may be used to specify an additional look-up operation.

Use of the above-described memory mapping scheme permits memory page sharing among the port processors supported by a particular translator. Stated differently, memory mapping allows one port processor 14, 18 to use more than the standard allotment of memory pages if another port processor associated with the same translator 24, 40 uses less than the standard allotment. For example, in the illustrative embodiment, each port processor (TSPP 14 and FSPP 18) supports 16,384 connections. With each translator 24, 40 supporting up to four port processors 14, 18, respectively, significant memory space is required to store connection information. However, in certain applications, some port processors 14, 18 support fewer than 16,384 connections while other port processors associated with the same translator support the maximum 16,384 connections. With the above-described memory mapping scheme, a port processor with a low number of connections can give up some memory to a port processor that has more connections. The mapping provides for dynamic reconfiguration of multipoint information as port processors are inserted/removed from an in-service switch.

Having described the preferred embodiments of the invention, it will now become apparent to one of skill in the art that other embodiments incorporating their concepts may be used. It is felt therefore that these embodiments should not be limited to disclosed embodiments but rather should be limited only by the spirit and scope of the appended claims.

We claim:

1. A switch for permitting data flow within a network, comprising:
   at least one input port for receiving data from said network;
   at least one output port for transmitting data from said switch;
   a switch fabric coupled between said at least one input port and said at least one output port and operative to permit data flow between said at least one input port to said at least one output port, wherein said switch fabric comprises
      a connection topology memory,
      at least one input side translator associated with said at least one input port,
      at least one output side translator associated with said at least one output port, and
      a bandwidth arbiter coupled between said at least one input side translator and said at least one output side translator and operative to control data flow between said at least one input side translator and said at least one output side translator;
   at least one input port queue associated with said at least one input port; and
   at least one output port queue associated with said at least one output port for temporarily storing data received from said at least one input port queue, wherein said connection topology memory correlates said at least one input port queue to said at least one output port queue,
   wherein said connection topology memory comprises
      a first connection topology memory, associated with said at least one input side translator, operable to contain a first entry correlating said at least one input port queue to a bit vector, and
      a second connection topology memory associated with said at least one output side translator.

2. The switch recited in claim 1 wherein said bit vector identifies said at least one output port.

3. The switch recited in claim 1 wherein said first connection topology memory contains a second entry which correlates said input port queue to either a multiqueue number for a point to point connection or a broadcast number for a point to multipoint connection.

4. The switch recited in claim 3 wherein said multiqueue number identifies said at least one output port queue and said broadcast number identifies said multiqueue number.

5. The switch recited in claim 4 wherein said second connection topology memory contains an entry which correlates said broadcast number to a multiqueue number for said point to multipoint connection.

6. A switch for permitting data flow within a network, comprising:
   at least one input port for receiving data from said network;
   a plurality of output ports for transmitting data from said switch;
   at least one input port queue associated with said at least one input port;
   at least one output port queue associated with each of said plurality of output ports for temporarily storing data received at the respective output port; and a switch fabric coupled between said at least one input port and said plurality of output ports, said switch fabric comprising:

at least one input side translator associated with said at least one input port;

at least one output side translator associated with a predetermined number of said plurality of output ports;

a bandwidth arbiter coupled between said at least one input side translator and said at least one output side translator and operative to control data flow between said at least one input side translator and said at least one output side translator; and a first connection topology memory associated with said at least one input side translator and a second connection topology memory associated with said at least one output side translator, wherein said first connection topology memory is operable to contain a first entry correlating said at least one input port queue to a bit vector and a second entry correlating said at least one input port queue to either a multiqueue number for a point to point connection or a broadcast number for a point to multipoint connection, and wherein said first and second connection topology memories correlate said at least one input port queue to said at least one output port queues.

7. The switch recited in claim 6 wherein said bit vector identifies a selected one of said plurality of output ports, said multiqueue number identifies said at least one output port queue and said broadcast number identifies said multiqueue number.

8. The switch recited in claim 6 wherein said second connection topology memory contains an entry correlating said broadcast number to a multiqueue number for said point to multipoint connection.

9. A switch for permitting data flow within a network, comprising:

at least one input port for receiving data from the network;

at least one output port for transmitting data from said switch;

at least one input port queue associated with said at least one input port;

at least one output port queue associated with said at least one output port for temporarily storing data received from said at least one input port queue; and a switch fabric coupled between said at least one input port and said at least one output port, said switch fabric comprising:

at least one input side translator associated with said at least one input port;

at least one output side translator associated with said at least one output port;

a bandwidth arbiter coupled between said at least one input side translator and said at least one output side translator and operative to control data flow between said at least one input side translator and said at least one output side translator; and a connection topology memory associated with said at least one input side translator, operable to contain a first entry which correlates said at least one input port queue to either a multiqueue number for a point to point connection or a broadcast number for a point to multipoint connection and a second entry which correlates said at least one input port queue to a bit vector.

10. The switch recited in claim 9 wherein said bit vector identifies said at least one output port, said multiqueue number identifies said at least one output port queue and said broadcast number identifies said multiqueue number.

11. The switch recited in claim 9 further comprising a second connection topology memory associated with said at least one output side translator and containing an entry which correlates said broadcast number to a multiqueue number for said point to multipoint connection.

12. A method for identifying at least one destination output port queue of a network switch for receipt of a data cell, comprising the steps of:

sending an input port queue number of an input port queue to an input side translator of said switch, said input side translator looking up a bit vector identifying at least one output port of said switch and looking up either a first multiqueue number if said data cell is associated with a point to point connection or a broadcast number if said data cell is associated with a point to multipoint connection;

sending said bit vector and either said first multiqueue number or said broadcast number to an output side translator associated with said at least one output port identified by said bit vector, said output side translator looking up a second multiqueue number in response to receipt of said broadcast number; and said at least one output port identifying at least one output port queue associated therewith for receipt of said data cell in response to said first multiqueue number or second multiqueue number.

* * * * *